Oct. 13, 1959 J. H. POWERS 2,908,147
ROOM AIR CONDITIONING APPARATUS HAVING FILTER
ARRANGEMENT FOR INDEPENDENT OPERATION
Filed April 8, 1957 2 Sheets-Sheet 1

INVENTOR.
JAMES H. POWERS
BY
HIS ATTORNEY

INVENTOR.
JAMES H. POWERS
BY
HIS ATTORNEY

United States Patent Office 2,908,147
Patented Oct. 13, 1959

2,908,147

ROOM AIR CONDITIONING APPARATUS HAVING FILTER ARRANGEMENT FOR INDEPENDENT OPERATION

James H. Powers, Middletown, Ky., assignor to General Electric Company, a corporation of New York Application April 8, 1957, Serial No. 651,362

8 Claims. (Cl. 62—186)

The present invention relates to room air conditioning apparatus and more particularly to such an apparatus having a filter and air flow system arranged for operation independently of the remaining components of the apparatus.

Many room air conditioners are provided with complicated and expensive air filters which remove smoke and dust particles from the air stream being circulated through the unit for conditioning the room. A good many of these air conditioner units are operated only during the few warm months of the year and consequently the air filtering unit therein is utilized only during this short period. Even during this period, the air conditioner is operated only at intervals and the air filtering is, therefore, not continuous. Because of this, the usefulness of these expensive air purifying units is not effectively exploited. To be of any real benefit these filters should be arranged such that they can be economically utilized 24 hours a day and for days at a time, if desired. However, the design of many of the present day air conditioners is such that it is uneconomical to operate the unit to obtain the benefit of air filtering alone. That is, the power consumed by circulating the air stream through the remaining components of the apparatus raises the cost of operating such an apparatus to the point where it becomes uneconomical to obtain this air purification, except as a supplemental benefit to the cooling operation. Furthermore, many air conditioners now on the market which also provide means for venting fresh air from the outside to the enclosure, fail to provide means by which this outside air may be passed through the filter prior to being discharged into the enclosure. When this is the case the outside air vented into the enclosure carries with it much of the pollen and dust which present day filters are intended to remove, thereby defeating the purpose of the filter.

Accordingly, it is an object of the present invention to provide an improved room air conditioning apparatus having a filter and an air flow system which may be operated continuously and economically during the off season without circulating the air stream through the remaining components of the unit.

Another object of the present invention is to provide an air conditioner including an improved air moving arrangement for circulating air from within an enclosure through a filter and back into the enclosure which arrangement is operated at reduced capacity to obtain only filtering of the air under conditions when no cooling is required.

A further object of the present invention is to provide an arrangement whereby outside air which is vented into the room through the air conditioning apparatus is passed through the filter prior to being discharged into the enclosure.

Further objects and advantages of the invention will become apparent as the following description proceeds and the features which characterize the invention will be pointed out with particularity in the claims annexed to and forming a part of this specification.

In order to carry out the objects of the present invention there is provided a room air conditioning unit having a compressor, condenser and evaporator arranged in refrigerant flow relationship and having air moving means for blowing separate streams of air through the evaporator and condenser from inside and outside of the enclosure respectively. By means of a suitably designed air baffle and bypass air duct arrangement, the air stream flowing through the evaporator is circulated within the unit only over the filter before being discharged back into the room. Means are also provided for disconnecting the driving power to the air moving means for circulating the air stream over the condenser and for reducing the velocity of the air moving means for blowing the air stream over the evaporator thereby providing both a reduction in the power consumption of the unit and a reduction of noise.

For a better understanding of the invention, reference may be had to the accompanying drawings in which.

Figure 1:
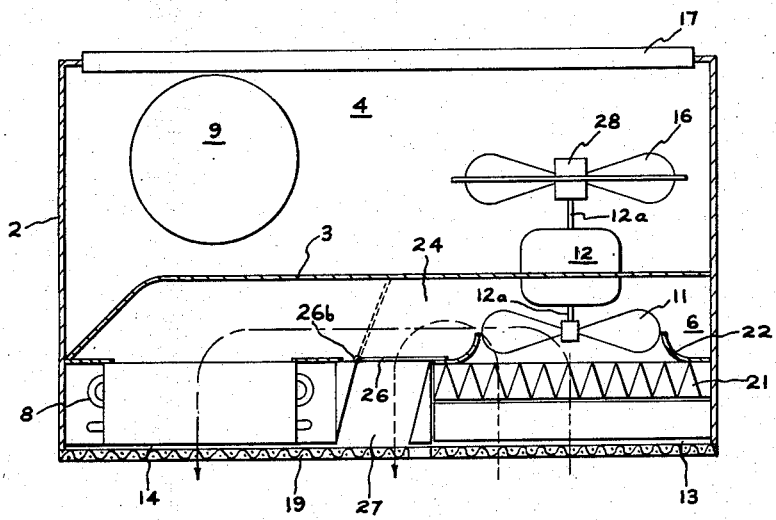
Fig. 1 is a schematic plan view of an air conditioning unit embodying the filter and air flow arrangement of the present invention.

In Fig. 1 of the drawing, there is shown an air conditioning unit comprising a metallic casing 2 which is divided by a barrier member 3 into two separate compartments designated the condenser or outer compartment 4 and the evaporator or inner compartment 6. A condenser 7 (shown in Fig. 2) is positioned in the upper extremities of the condenser compartment 4 and an evaporator 8 is located within the evaporator compartment 6. The evaporator 8 and condenser 7 are connected in refrigerant flow relationship with a compressor 9 which is also located in the condenser compartment 4. In order to circulate air from within the enclosure through the inner or evaporator compartment 6 for cooling the air, there is provided a fan or air moving means 11 in the lower portion of the evaporator compartment upstream from the evaporator. The fan is driven by a shaft 12a from the multispeed motor 12 mounted in the barrier member 3. The motor 12 is of the type which may operate at a range of different speeds depending upon the current supplied to its windings. Air from the room or enclosure to be conditioned is drawn through the inlet opening 13 and circulated by the fan 11 through the evaporator compartment, over the evaporator 8 and discharged out the outlet opening 14.

In order to circulate an air stream from the outside over the condenser 7, a second air moving means or fan 16 is provided in the lower portion of the condenser compartment 4. Air is pulled into the condenser compartment 4 through the lower inlet opening 17 and circulated upwardly through the compartment and over the condenser 7 whereupon it is discharged from the unit through the outlet opening 18. As illustrated in Fig. 1, both of the fans 11 and 16 are powered by the same driving means, namely the multispeed motor 12 through the shaft 12a. This is a common means for driving the separate fans within the evaporator and condenser compartments, however, separate motors could be used to drive each of the fans and the corresponding air flow and results accomplished by the present invention would be the same, as will be later described. On the front of the air conditioner, extending completely across the front of the evaporator compartment 6, there is provided a decorative front grille or cover 19 which is removable in order to permit periodical entrance into the evaporator compartment for maintenance purposes. As thus far described this particular structure of the air conditioner is not considered essential to the invention, but is intended only to be illustrative of the type of air conditioner to which the invention may be adapted. As will now be explained, the present invention relates to a filter arrangement and air flow system within the conditioner which makes possible the continuous and economical operation of the conditioner as an air purifier even though the conditioner is not operated for its air cooling capacity.

In order to purify the air circulating through the unit, a filter 21 is provided a short distance behind the inlet opening 13. The filter 21 is arranged entirely across the scroll 22 leading to the fan 11 such that any air circulated through the scroll 22 must previously pass through the filter. This filter may be any of the well known types now on the market but it was contemplated that it be an electrostatic filter which is capable of removing particles having a cross section of extremely small size. These filters are capable of removing dust and pollens from the air which are reputed to cause hay fever and other types of allergies. If such a filter is used, the requisite electrical power components must be supplied and will be arranged in the general area within the evaporator compartment designated 23, which also houses the remaining electrical and operating controls of the air conditioner.

When the air conditioner unit is operating on a cooling cycle, both the refrigeration system and the air moving means are appropriately energized. Air from within the enclosure enters the unit through the inlet opening 13 whereupon it is pulled through the filter 21 by the fan 11. After passing through the scroll 22 and the fan 11, the air stream encounters the barrier 3 and is thereupon directed along the passage 24 toward the left hand portion of the compartment, as seen in Fig. 1, whereupon it passes through the evaporator 8 and is again discharged into the room through the discharge opening 14. This flow of air during the cooling operation is shown by the dot-dash line indicated in Fig. 1.

In order to obtain the benefits of having the air recirculated from within the enclosure over the filter 21 during the season when cooling is not required, and in order to obtain this operation in the most economical manner, the present invention provides a means for diverting the air stream around the evaporator 8 and discharging it directly into the enclosure after passing it through the filter 21. More specifically there is provided an air baffle 26 which normally lies in the position shown in solid lines in Fig. 1. When the air baffle 26 is in its solid line position shown in Fig. 1, it entirely covers the opening to the bypass duct 27 which also leads to the discharge opening 14 of the evaporator compartment 6. The opening to the bypass duct 27 is upstream from the evaporator 8 and downstream from the filter 21. The air baffle 26 is movable to a second position indicated by the dotted lines in Fig. 1. When in this position, the air baffle 26 completely seals off the passage 24 leading to the evaporator 8 and diverts the air stream flowing along the passage 24 into the bypass duct 27 thereupon discharging the filtered air back into the enclosure through the bypass duct 27. The air baffle may be moved between its two positions either automatically or by manual means. For example, it may be turned by a knob (not shown) extending from the pivot rod 26b, or by an operating arm (not shown) connecting with the baffle and manually operated from the front of the machine.

When the air conditioner is operated for air purification only, it is unnecessary to energize the refrigeration system of the unit since cooling of the air is not actually desired. Accordingly, control means are provided which energize only the fan motor 12 while disconnecting the source of power to the compressor 9. Many room air conditioners now on the market provide means for operating only the air moving components of the unit independently of the remaining components and one of these controlling arrangements for obtaining this operation may be utilized.

During the operation of the unit to provide only air purification, it is unnecessary to circulate a stream of air through the condenser compartment. In fact, such operation is uneconomical since the energy expended in moving the air stream through the condenser compartment necessarily causes a reduction in the speed of the evaporator fan when both fans are driven by the same motor. Also, when each fan is driven by a separate motor, the power consumed by the condenser fan is unnecessary during the operation. Consequently, the present invention provides means for disconnecting the drive to the fan 16 when the apparatus is operated on the air purification cycle only and eliminating this pressure loss resulting from the air being circulated through the condenser compartment. In the present invention, when both the condenser compartment fan 16 and the evaporator compartment fan 11 are driven by the same driving motor, such as the motor 12 in Fig. 1, the condenser fan 16 is disconnected from the drive shaft 12a through the use of a clutch 28 which can be actuated by electrical or mechanical means to permit the fan 16 to slip on the drive shaft 12a thereby eliminating the drag on the shaft produced by the fan. More specifically, the fan 16 may be released by a clutch 28 which is energized at the same time the air baffle 26 is moved across the path of the air stream in passage 24 to shunt the air around the evaporator. Means for operating the clutch 28 upon movement of the air baffle 26 are described in greater detail later. Of course, when two separate fan motors are used, a switch may be provided which simply disconnects the power supply to the condenser fan motor, the switch being actuated upon movement of the air baffle 26. By the elimination of the "drag" of the condenser fan 16 and, by the elimination of the pressure losses resulting from the flow of air over the evaporator, the speed of the fan motor 12 and thereby the velocity of the fan 11 is actually increased for the same current flow to the motor 12 that normally is required during cooling of the air. Accordingly, by the present invention it is possible, during the air purification operation, to reduce the current to the motor 12 and thereby reduce the velocity of fan 11 and still maintain an air flow or recirculation of air from within the room corresponding to that obtained during the cooling operation of the unit. By reducing the current to the motor 12 the amount of power consumed can be greatly reduced. In addition to the reduction in power consumption, by permitting the use of lower fan speeds, the invention provides a great reduction in noise level during operation of the unit for air purification purposes.

Figure 4:
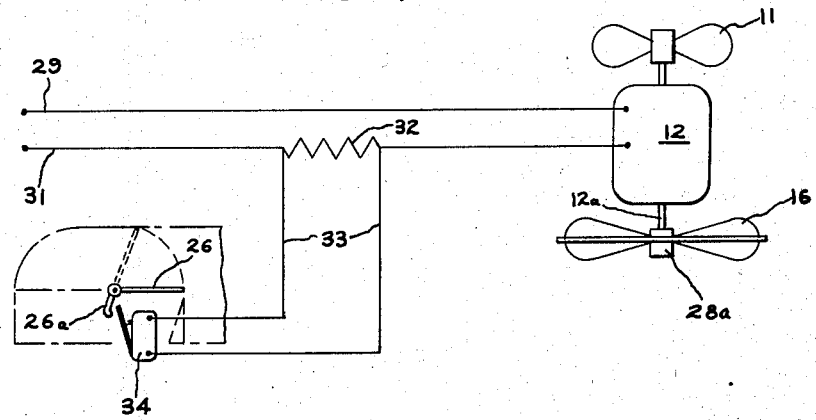
Fig. 4 is a schematic diagram illustrating a controlling arrangement whereby power consumption of the unit can be substantially reduced.

One means for disconnecting the driving mechanism to the condenser fan 16 and for reducing the current to the motor 12, and thereby reducing the speed of the evaporator fan 11, is shown in the schematic control diagram of Fig. 4. As can be seen in Fig. 4, power is supplied to the fan motor 12 through the lines 29 and 31. In line 31 there has been connected in series with the motor 12, a resistance 32 designed to cut down the current supplied to the motor 12. A low resistance shunting line 33 is connected around the resistance 32 and provides a conducting path of less resistance than the path through the resistor 32. A normally closed switch 34 is provided in the bypass line 33 which, when closed, permits a substantially high current to flow through the bypass line 33 thereby supplying power to the motor 12. By means of a lever or switch arm 26a extending from the air baffle 26, which is operated simultaneously with the movement of the air baffle 26 across the passage 24, the normally closed switch 34 is actuated into the open position. Upon the opening of the switch 34, the power supplied to the motor 12 must necessarily flow through the resistor 32, thereby reducing the current supplied to the motor 12 and reducing the velocity of the drive shaft 12a. Thus, by reducing the numbers of amps flowing through the motor 12, the speed of the drive shaft 12a is greatly reduced and the overall power consumption within the line may also be reduced.

Since it is desirable to reduce the speed of drive motor 12 to obtain a reduction in power consumption, this reduction in speed may also be used advantageously to disconnect the condenser fan 16 from the drive shaft 12a in those units wherein both the condenser fan and the evaporator fan are driven by the same motor. This is accomplished by providing a centrifugal clutch 28a which is designed to release the fan 16 at a predetermined velocity of the drive shaft 12a. Thus, when the motor is operating at its maximum velocity and the air conditioning unit is operating on its normal cooling cycle the centrifugal clutch 28a will engage the condenser fan 16 and thereby move the air stream through the condenser compartment 4. At the reduced operating speeds of the motor 12, when the unit is operating on the air purifying cycle only, the centrifugal clutch releases the condenser fan 16 and allows the shaft 12a to rotate without the condenser fan, and thus eliminates the corresponding drag of the air stream blown through the condenser compartment.

Figure 5:
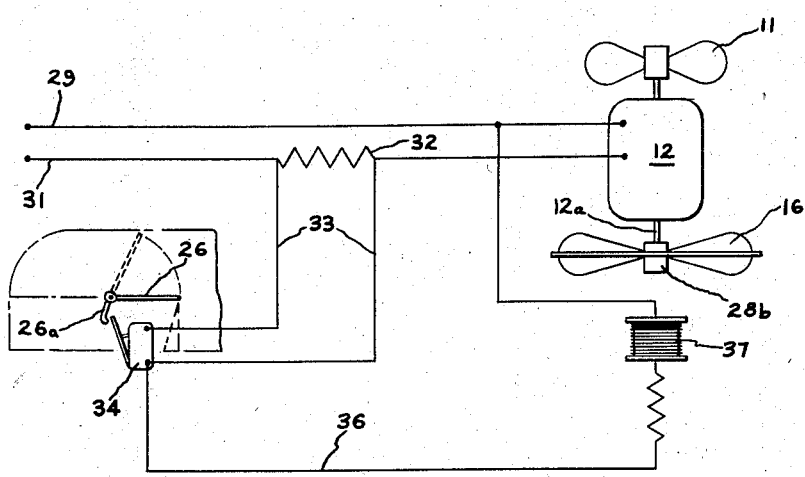
Fig. 5 is another schematic diagram illustrating the controlling arrangement whereby a magnetic clutch is used to disconnect the condenser air moving means.

A second means for releasing the condenser fan is illustrated in Fig. 5. In this control scheme, when the switch 34 is operated to open its contacts and prevent shunting of current around the resistance bypass circuit 33 another circuit 36 containing an electromagnetic clutch coil 37 is de-energized. The electromagnetic clutch coil 37 actually forms a part of the electromagnetic clutch 28b, but for purposes of illustration it is shown schematically in Fig. 5 as a separate component. Thus, as the resistance 32 is thrown into the power line to the motor 12 the magnetic clutch 28b which has been energized to lock the condenser fan 16 into engagement with the shaft 12a is de-energized thereby releasing the shaft to turn without the fan 16. By either of the above means it is possible to release the condenser fan from the motor shaft and run the motor shaft at reduced speed to thereby effect a reduction in the power consumption of the drive motor 12. This is permissible because the air recirculating during the air purification operation is required to pass through only the filter and not both the filter and the evaporator.

Figure 2:
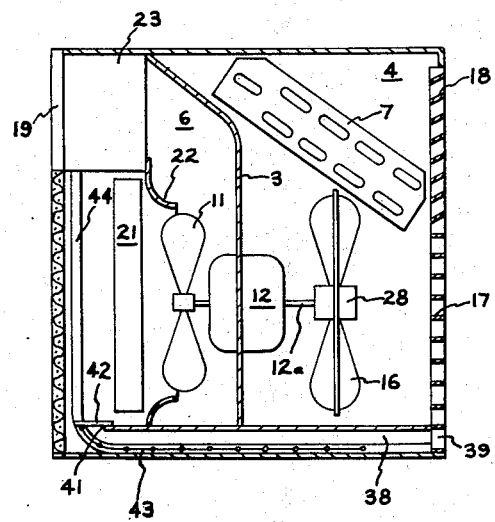
Fig. 2 is a side elevational view of the air conditioning unit of Fig. 1 with the end casing removed.
Figure 3:
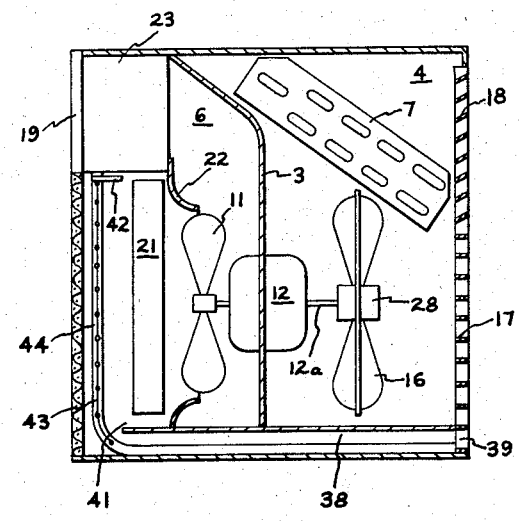
Fig. 3 is an elevation view similar to that shown in Fig. 2 illustrating the air flow arrangement for venting outside air through the filter and into the enclosure.

Many air conditioners, now on the market, provide some means for ventilating the enclosure with fresh outside air. Since this outside air generally contains dust and many of the pollens which cause hay fever and other allergies, it is desirable that this outside air first pass through the filtering elements before being discharged into the room. Figs. 2 and 3 show a means by which this ventilation of outside air may be accomplished very simply during either the air purification cycle or the air cooling cycles in the air conditioner of the present invention.

Referring now to Figs. 2 and 3, there can be seen, in the lower portion of the unit, a duct 38 arranged to promote the flow of outside air through vent intake 39 along the duct 38 and discharge it through ventilator discharge opening 41 into the unit at a point just upstream from the filter member 21. Means are provided for closing the ventilator discharge opening 41 during operation of the unit on either the air conditioning cycle or the air purification cycle. More specifically these means include a closure panel 42 having attached thereto a flexible air inlet panel 43 which slides upwardly along a track 44 to effectively close the room air inlet opening 13 whenever ventilation from the outside is desirable. As may be seen in Fig. 3, whenever the flexible inlet panel 43 is in its upwardmost position, it completely prevents air from entering the unit from within the enclosure. When the flexible air inlet panel 43 is in this position, the closure panel 42 has been removed from the ventilator discharge opening 41 thereby permitting outside air to flow through the air duct 38 into the area in compartment 6 just upstream from the filter 21. By operating the fan 11, when the flexible inlet panel 43 is in its upward position, air is vented into the evaporator compartment 6 from the outside and pulled through the filter 21 whereupon it is passed along the passage 24 and thereupon circulated either through the evaporator 8 or shunted through the bypass duct 27 depending upon the position of the air baffle 26. Thus, by having the outside air duct discharge within the unit at some point just upstream from the filter 21, complete filtering of the outside air is obtained prior to its discharge into the enclosure, thereby removing all detrimental dust and pollens included in the air supply for ventilation purposes.

By the present invention there has been provided an air conditioning unit having a filter and air flow arrangement permitting economical and continuous operation of the unit for air purification purposes even during those periods when the unit is not operated for its cooling function. Furthermore, this arrangement also permits operation of the air moving means of the system at a reduced capacity while maintaining a volume of air flow corresponding to that obtained during operation of the unit on the air cooling cycle which results in a less noisy operation. The present invention further provides, in combination with its economical air purification operation, a ventilating arrangement whereby outside air may be continuously circulated through the filter prior to being discharged into the enclosure.

While in accordance with the patent statutes there has been described what at present is considered to be the preferred embodiments of the invention, it will be obvious to those skilled in the art that various changes and modifications may be made therein without departing from the invention, and it is, therefore, the aim of the appended claims to cover all such changes and modifications as fall within the true spirit and scope of the invention.

What I claim as new and desire to secure by Letters Patent of the United States is:

1. In a room air conditioning unit having an evaporator arranged within an inner compartment, the combination comprising air moving means in said inner compartment for circulating a stream of air from inside a room over said evaporator, said air moving means being disposed upstream from said evaporator, a filter disposed across the path of said air stream circulated through said inner compartment, air bypass means in said inner compartment having an opening arranged upstream from said evaporator and downstream from said filter, air baffle means disposed downstream from said filter and movable across the path of said air stream circulating in said inner compartment for shunting said air stream into said air bypass means around said evaporator and into the said room thereby to permit circulation of room air through said filter without passing through said evaporator and means for decreasing the speed of operation of said air moving means in said inner compartment thereby to reduce the power consumption of said air moving means during operation of said unit for air filtering only.

2. An air conditioner for conditioning a room comprising a housing, said housing being divided into a plurality of compartments including an inner compartment disposed adjacent a room to be conditioned, an evaporator in said inner compartment, air moving means for circulating a stream of air from said room through said inner compartment over said evaporator and discharging it back into said room, said air moving means being disposed upstream from said evaporator, a filter disposed across the path of said air stream circulating within said inner compartment, a bypass air duct in said inner compartment for bypassing air around said evaporator, said bypass duct having an opening arranged downstream from said filter and upstream from said evaporator, an air baffle in said inner compartment normally positioned across said opening of said bypass duct, said air baffle arranged for movement across said air stream circulating through said evaporator thereby shunting said air stream into said bypass duct and means to condition said air moving means for operation at decreased capacity whereby the power consumption for continuously circulating air from within the room through said inner compartment is reduced.

3. An air conditioner for conditioning a room comprising a housing, a barrier dividing said housing into an inner compartment and an outer compartment, a condensing unit in said outer compartment, an evaporator in said inner compartment, a first fan for circulating a stream of air from said room through said inner compartment over said evaporator and discharging it back into said room, a second fan for circulating a stream of air through said outer compartment over said condenser, a filter disposed across the path of said air stream circulating within said inner compartment, a common drive motor connected to each of said fans to operate said fans for circulating said air streams, a bypass air duct in said inner compartment for bypassing air around said evaporator, an air baffle in said inner compartment normally positioned across said bypass duct, said air baffle arranged for movement across said air stream circulating within said inner compartment thereby shunting said air stream into said bypass duct and around said evaporator, means actuated by movement of said air baffle to disconnect said second fan from said common drive means, and means also actuated by movement of said air baffle to reduce the speed of said drive motor thereby to operate said first air moving means at reduced speed whereby power consumption of said common drive motor is reduced during operation of said first fan to provide circulation of air from within the room through said filter and said bypass duct.

4. The combination of claim 2 including a second air duct means for introducing outside air into said inner compartment at a point upstream from said filter, whereby fresh filtered outside air may be vented into said room.

5. An air conditioner for conditioning a room comprising a housing, a barrier dividing said housing into an inner compartment and an outer compartment, air inlet and discharge openings in each of said compartments, a condensing unit in said outer compartment and an evaporator in said inner compartment, a fan for circulating a stream of air from said room through said inner compartment over said evaporator and discharging it back into said room, a second fan for circulating a stream of outside air through said outer compartment over said condenser, an electrostatic filter disposed across the path of said air stream circulating within said inner compartment, said electrostatic filter being disposed downstream from said air inlet opening in said inner compartment, a bypass air duct in said inner compartment for bypassing air around said evaporator, an air baffle in said inner compartment normally positioned across said bypass duct, said air baffle arranged for movement across said air stream circulating within said inner compartment thereby shunting said air stream into said bypass duct and out said discharge opening, means actuated by movement of said air baffle across said air stream to interrupt operation of said second fan, and means also actuated by movement of said air baffle across said air stream to reduce the speed of said first fan thereby reducing the power consumption of said first fan in circulating said air stream through said filter and said bypass duct, means for venting outside air into said inner compartment at a point upstream from said electrostatic filter and downstream from said inlet opening, means for closing said air inlet opening to said first compartment when said vent means is conditioned to vent outside air into said inner compartment whereby fresh outside air may be circulated through said electrostatic filter prior to being discharged into said room.

6. An air conditioner for conditioning a room comprising a housing, a barrier dividing said housing into an inner compartment and an outer compartment, air inlet and discharge openings in each of said compartments, a condensing unit in said outer compartment and an evaporator in said inner compartment, a first fan for circulating a stream of air from said room through said inner compartment over said evaporator and discharging it back into said room, a second fan for circulating a stream of air through said outer compartment over said condenser, a drive motor having a common drive shaft for operating said fans to circulate said air stream, a filter disposed across the path of said air stream circulating within said inner compartment, a bypass air duct in said inner compartment for bypassing air around said evaporator, an air baffle in said inner compartment normally positioned across said bypass duct, said air baffle arranged for movement across said air stream circulating within said inner compartment thereby shunting said air stream into said bypass duct and around said evaporator, a centrifugal clutch for engaging said drive motor shaft with said second fan at a predetermined rotational speed of said drive shaft, and means actuated by movement of said air baffle across said air stream to decrease the speed of said drive motor and thereby reduce the speed of said shaft below said predetermined rotational speed thereby to disconnect said second fan from said drive shaft, and to operate said first fan at a reduced speed whereby power consumption of said common drive motor is reduced during operation of said first fan to provide circulation of air from within said room through said filter and said bypass duct.

7. An air conditioner for conditioning a room comprising a housing, a barrier dividing said housing into an inner compartment and an outer compartment, air inlet and discharge openings in each of said compartments, a condensing unit in said outer compartment and an evaporator in said inner compartment, a first fan for circulating a stream of air from said room through said inner compartment over said evaporator and discharging it back into said room, a second fan for circulating a stream of air through said outer compartment over said condenser, an electrical drive motor having a common drive shaft for operating both of said fans to circulate said air streams, a centrifugal clutch connecting said second fan to said drive shaft at a predetermined rotational speed of said shaft, said clutch releasing said fan when said drive shaft falls below said predetermined speed, a filter disposed across the path of said air stream circulating within said inner compartment, a bypass air duct in said inner compartment for bypassing air around said evaporator, an air baffle in said inner compartment and normally positioned across said bypass duct, said air baffle arranged for movement across said air stream circulating within said inner compartment thereby shunting said air stream into said bypass duct and around said evaporator, a circuit supplying electrical current to said motor, an electrical resistor, switch means for introducing said resistor into said electrical circuit to said motor for reducing the current supplied to said motor and thereby reducing the rotational speed of said drive shaft below said predetermined speed, and a switch arm extending from said air baffle for actuating said switch upon movement of said air baffle across said air stream whereby said centrifugal clutch is conditioned to disconnect said second fan and said first fan is operated at a reduced speed for circulating an air stream from within said room through said filter and said bypass duct.

8. An air conditioner for conditioning a room comprising a housing, a barrier dividing said housing into an inner compartment and an outer compartment, air inlet and discharge openings in each of said compartments, a condensing unit in said outer compartment and an evaporator in said inner compartment, a first fan for circulating a stream of air from said room through said inner compartment over said evaporator and discharging it back into said room, a second fan for circulating a stream of air through said outer compartment over said condenser, an electrical drive motor having a common drive shaft for operating both of said fans to circulate said air streams, an electromagnetic clutch having a coil which may be energized and de-energized to respectively connect and disconnect, said second fan to said drive shaft, a filter disposed across the path of said air stream circulating within said inner compartment, a bypass air duct in said inner compartment for bypassing air around said evaporator, an air baffle in said inner compartment normally positioned across said bypass duct, said air baffle arranged for movement across said air stream circulating within said inner compartment thereby shunting said air stream into said bypass duct and around said evaporator, a circuit supplying electrical current to said motor, an electrical resistor, and switch means for introducing said resistor into said electrical circuit to said motor for reducing the current supplied to said motor thereby reducing the rotational speed of said drive shaft, said switch means also de-energizing said electromagnetic clutch when said electrical resistor is introduced into said circuit to said motor, and a switch arm extending from said air baffle for actuating said switch upon movement across said air stream of said air baffle whereby said electromagnetic clutch is de-energized to release said second fan from engagement with said drive shaft and said first fan is operated at reduced speed to circulate said air stream from within said room through said filter and discharge said air stream out said bypass duct and said discharge opening.

References Cited in the file of this patent

UNITED STATES PATENTS

| | | |
|---|---|---|
| 2,451,366 | Terry | Oct. 12, 1948 |
| 2,502,980 | Moore | Apr. 4, 1950 |
| 2,540,957 | Newton | Feb. 6, 1951 |
| 2,720,090 | Ford | Oct. 11, 1955 |
| 2,724,247 | Kurtz | Nov. 22, 1955 |
| 2,736,176 | Carlton | Feb. 28, 1956 |
| 2,768,514 | McGrath | Oct. 30, 1956 |
| 2,810,273 | Bilgrei et al. | Oct. 22, 1957 |